US012158720B2

(12) United States Patent
Kubo

(10) Patent No.: US 12,158,720 B2
(45) Date of Patent: Dec. 3, 2024

(54) ELECTRICAL APPARATUS WITH OPENING PORTION PROVIDED IN A SIDE WALL OF EXTERIOR MEMBER AND IMAGE FORMING APPARATUS INCLUDING THE SAME

(71) Applicant: SHARP KABUSHIKI KAISHA, Sakai (JP)

(72) Inventor: Takashi Kubo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/988,789

(22) Filed: Nov. 17, 2022

(65) Prior Publication Data

US 2023/0185228 A1 Jun. 15, 2023

(30) Foreign Application Priority Data

Dec. 15, 2021 (JP) ................................ 2021-203260

(51) Int. Cl.
*G03G 15/00* (2006.01)

(52) U.S. Cl.
CPC .................................. *G03G 15/80* (2013.01)

(58) Field of Classification Search
CPC ..................................................... G03G 15/80
USPC ........................................................... 399/88
See application file for complete search history.

(56) References Cited

U.S. PATENT DOCUMENTS

2017/0031300 A1* 2/2017 Fukuda ................. H01R 24/66
2017/0060075 A1* 3/2017 Shimizu ................ G03G 15/80
2017/0148585 A1* 5/2017 Fukuda ................... B41J 29/13

FOREIGN PATENT DOCUMENTS

JP 2003-024863 A 1/2003
JP 2010197688 A * 9/2010
JP 2015-069029 A 4/2015

* cited by examiner

*Primary Examiner* — Quana Grainger
(74) *Attorney, Agent, or Firm* — ScienBiziP, P.C.

(57) ABSTRACT

An electrical apparatus is provided with an opening portion in a side wall of an exterior member. The electrical apparatus includes a recessed portion formed on the side wall in a portion above the opening portion. The recessed portion has a lateral width in a width direction orthogonal to both a vertical direction and a depth direction, which is equal to or larger than a lateral width of the opening portion in the width direction.

12 Claims, 10 Drawing Sheets

ELECTRICAL APPARATUS WITH OPENING PORTION PROVIDED IN A SIDE WALL OF EXTERIOR MEMBER AND IMAGE FORMING APPARATUS INCLUDING THE SAME

BACKGROUND OF THE INVENTION

Field of the Invention

The present disclosure relates to electrical apparatuses, such as image forming apparatuses, such as copying machines, multifunctional machines, printers, facsimile machines, or the like, information processing apparatuses, or the like.

Description of the Background Art

In an electrical apparatus with an opening portion provided in a side wall of an exterior member (for example, a side wall of an image forming apparatus main body), in a case where a user spills a liquid (for example, a liquid, such as tea, coffee, or the like in a cup), the liquid is likely to flow along a wall surface of the side wall to enter the opening portion and damage the electrical apparatus (for example, damage, such as a short circuit caused by the liquid in electrical components provided below the opening portion, specifically, in primary circuit boards, such as power circuit boards or the like, is likely to be caused).

In this regard, conventionally, a configuration in which, in order to prevent a liquid from entering a housing through the opening, a plurality of louvers extending horizontally across an opening are provided has been proposed.

A configuration in which louver plates with multi-level louver walls that open diagonally downward for waterproofing and drip-proofing are provided has been also conventionally proposed.

However, as in the known configurations described above, in a configuration in which louvers are provided, there is a disadvantage that a ventilation area that is an area of a ventilated portion of an opening portion (an area ratio of the ventilated portion to a total area of the opening portion) cannot be increased because of the presence of the louvers. For example, if the opening portion is an exhaust port or an intake port, the louvers provide resistance to air distribution, and accordingly, efficiency of exhaust or intake airflow is reduced.

It is conceivable to provide an eave in a portion of a side wall located above an opening portion to prevent a liquid from entering the opening portion, but the eave becomes a disturbance because the eave protrudes beyond a wall surface of the side wall. Moreover, it is necessary to increase strength of the eave in anticipation of objects crashing into the eave, and costs are increased.

It is therefore an object of the present disclosure is to provide an electrical apparatus and an image forming apparatus configured such that a ventilation area of an opening portion can be increased and also entry of a liquid into the opening portion can be suppressed without any portion protruding beyond a wall surface of a side wall therein.

SUMMARY OF THE INVENTION

To solve the above-described problem, the present disclosure provides an electrical apparatus with an Opening portion provided in a side wall of an exterior member, the electrical apparatus includes a recessed portion formed on the side wall in a portion above the opening portion, and the recessed portion has a lateral width in a width direction orthogonal to both a vertical direction and a depth direction, which is equal to or larger than a lateral width of the opening portion in the width direction. An image forming apparatus according to the present disclosure is an image forming apparatus that is an electrical apparatus according to the present disclosure, the opening portion is provided in the side wall of an exterior member of an image forming apparatus main body, the recessed portion is provided in a portion of the side wall located above the opening portion, and the recessed portion has a lateral width in the width direction orthogonal to both of the vertical direction and the depth direction, which is equal to or larger than the lateral width of the opening portion in the width direction.

According to the present disclosure, a ventilation area of an opening portion can be increased and, furthermore, entry of a liquid into the opening portion can be suppressed without any portion protruding beyond the wall surface of the side wall.

DESCRIPTION OF THE PREFERRED EMBODIMENTS

Embodiments of the present disclosure will be described below with reference to the accompanying drawings. In the following description, identical parts are denoted by a same reference sign, Names and functions thereof are same, Therefore, detailed description thereof will not be repeated.

Figure 1:
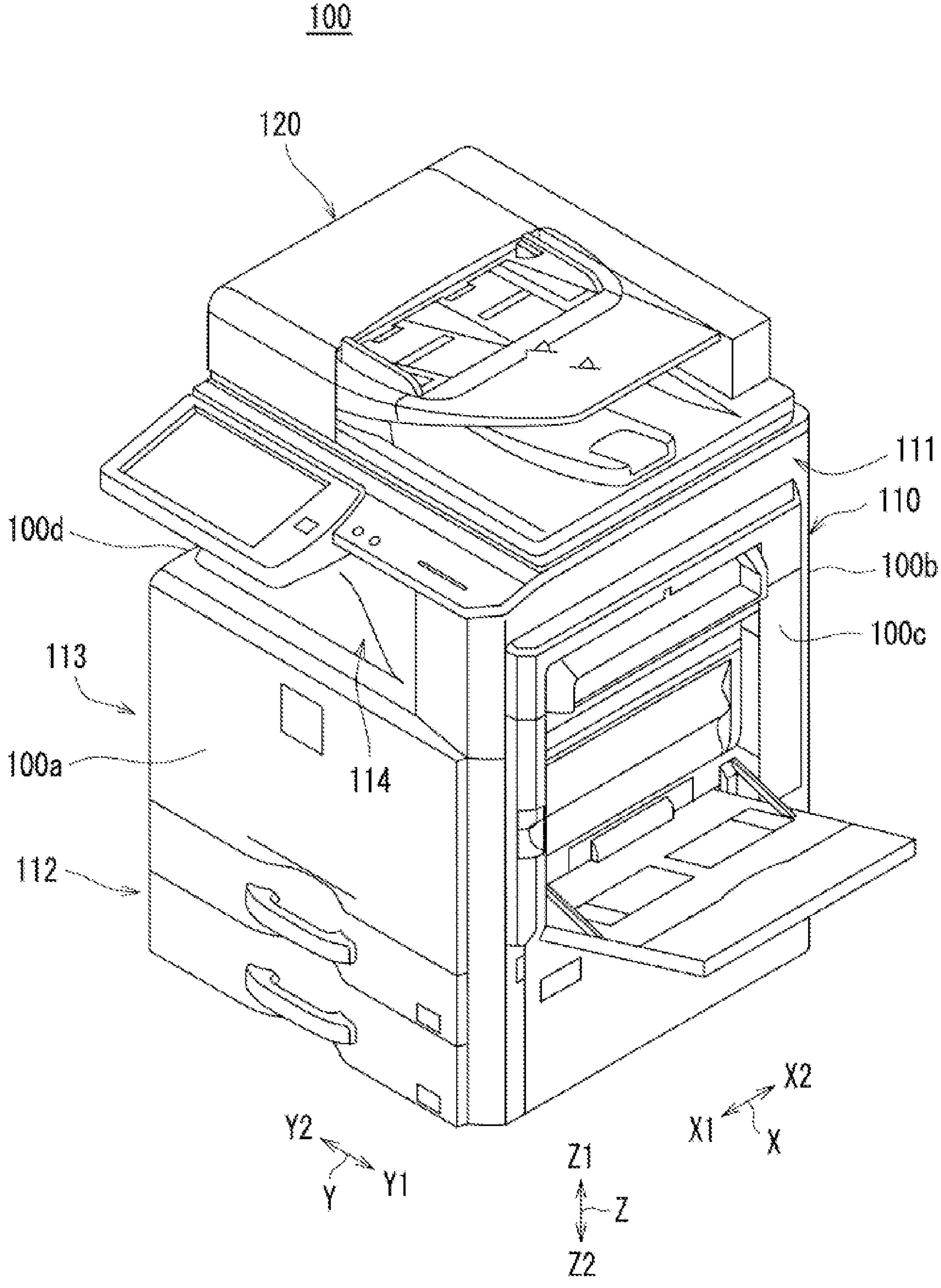
FIG. 1 is a perspective view illustrating an external appearance of an image forming apparatus that is an example of an electrical apparatus according to an embodiment of the present disclosure.
Figure 2:
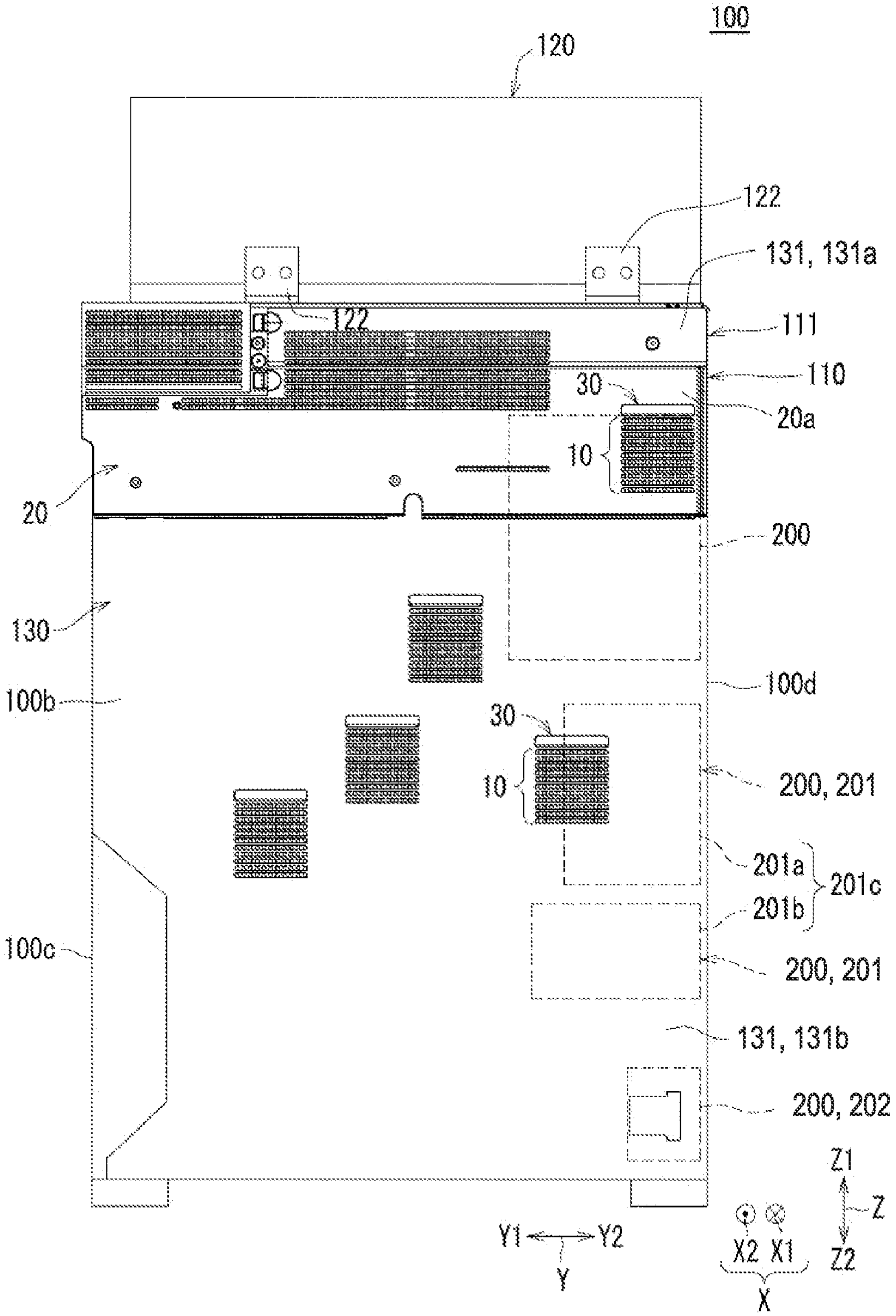
FIG. 2 is a rear view of the image forming apparatus illustrated in FIG. 1.

FIG. 1 is a perspective view illustrating an external appearance of an image forming apparatus 100 that is an example of an electrical apparatus according to an embodiment of the present disclosure. FIG. 2 is a rear view of the image forming apparatus 100 illustrated in FIG. 1.

A front surface 100*a* (operation surface) is at a front side X1 in a depth direction X of the image forming apparatus 100 and, as viewed from the front surface 100*a*, a rear surface 100*b* is at a rear side X2 in the depth direction X. As viewed from the front surface 100*a* of the image forming apparatus 100, in a width direction Y orthogonal to both the depth direction X and a vertical direction Z (up-down direction), a right side surface 100*c* is at one side Y1 (right side) and a left side surface 100*d* is at the other side Y2 (left side).

The image forming apparatus 100 is a multifunctional machine having a copy function, a scanner function, a facsimile function, and a printer function. The image forming apparatus 100 includes an image forming apparatus main body 110 and a document feeder 120. The image forming apparatus main body 110 includes an image reading unit. 111, a paper feeder 112, an image former 113, and a discharger 114.

The image reading unit 111 reads an image of a document and includes an unillustrated document reader (scanner). The image reading unit 111 reads an image of a document by the document reader while conveying the document by the document feeder 120 or scans and reads a document placed on a document mounting table by the document reader.

The image forming apparatus 100 is configured such that, when the document feeder 120 is opened by hinges 122, the document mounting table is opened and a document is manually placed on the document mounting table.

The paper feeder 112 accommodates sheets, such as recording paper or the like, and supplies the accommodated sheets toward the image former 113. The image former 113 forms (prints) images, based on image data, on a sheet fed from the paper feeder 112. The discharger 114 discharges the sheet on which the images have been formed by the image former 113.

First Embodiment

Figure 3A:
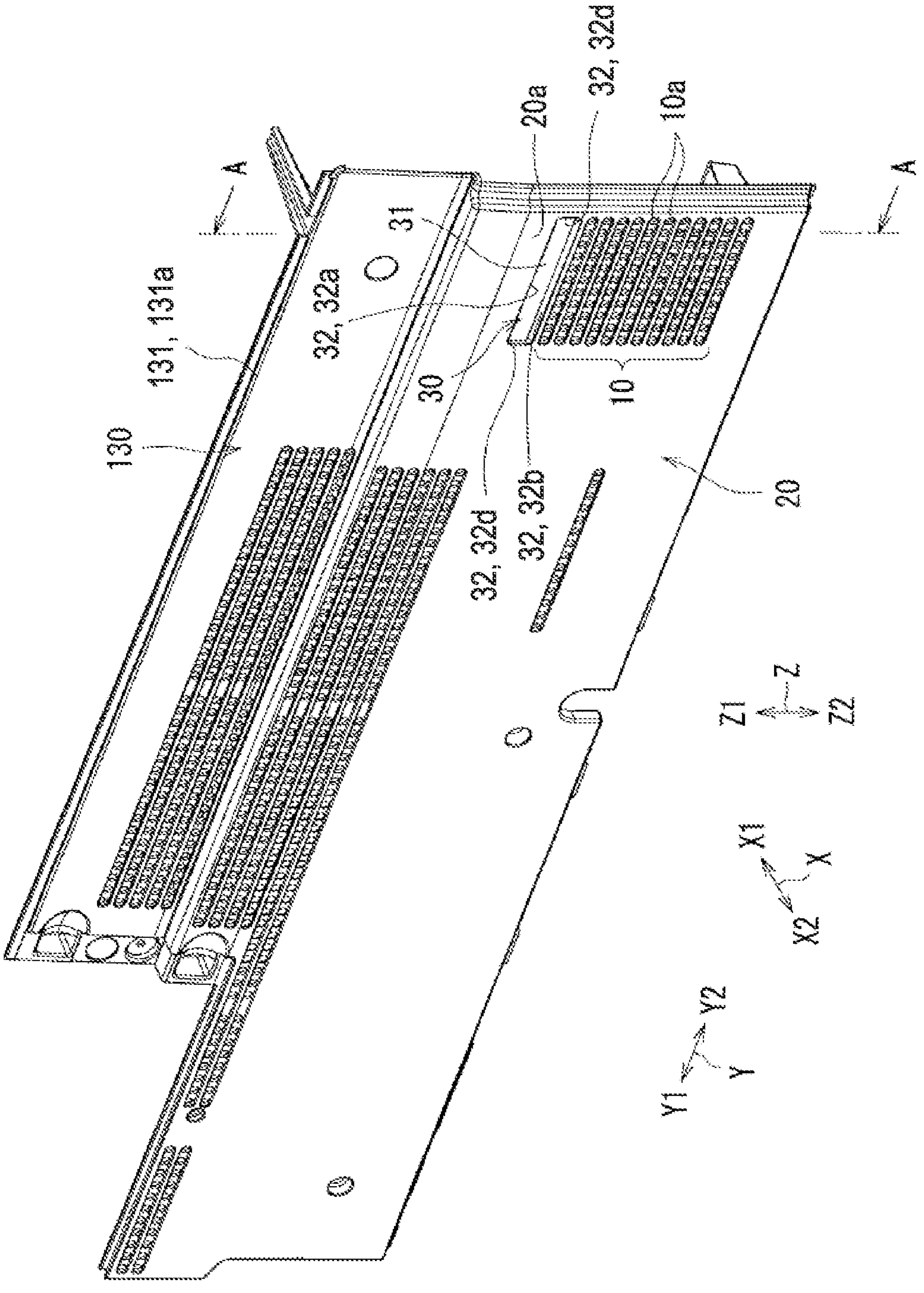
FIG. 3A is a perspective view of an exterior member provided on an image forming apparatus main body in an image forming apparatus according to a first embodiment, as viewed from diagonally above on a rear surface side.
Figure 3B:
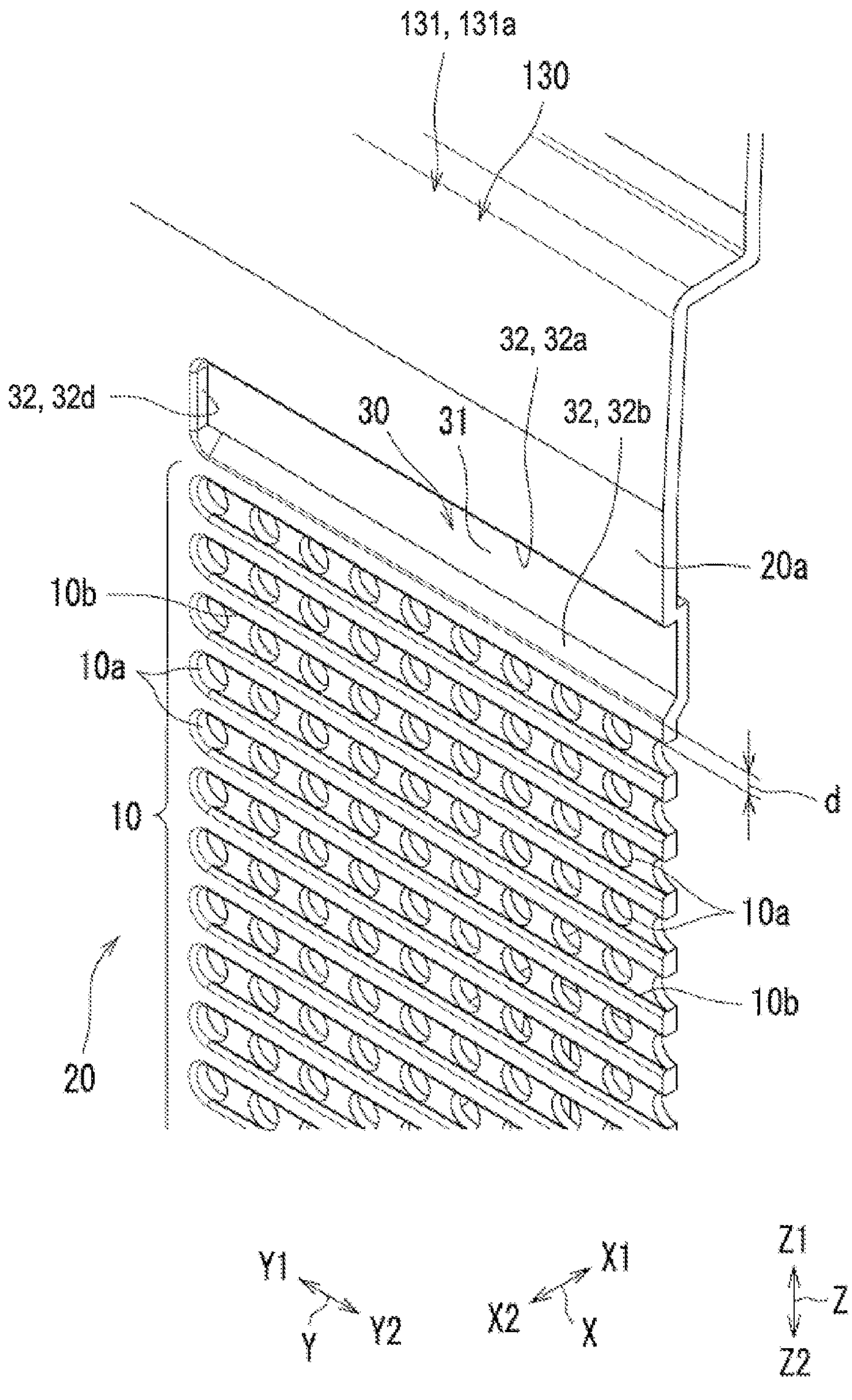
FIG. 3B is a perspective view illustrating a portion including an opening portion and a recessed portion in a cross section taken along a line A-A illustrated in FIG. 3A.
Figure 4A:
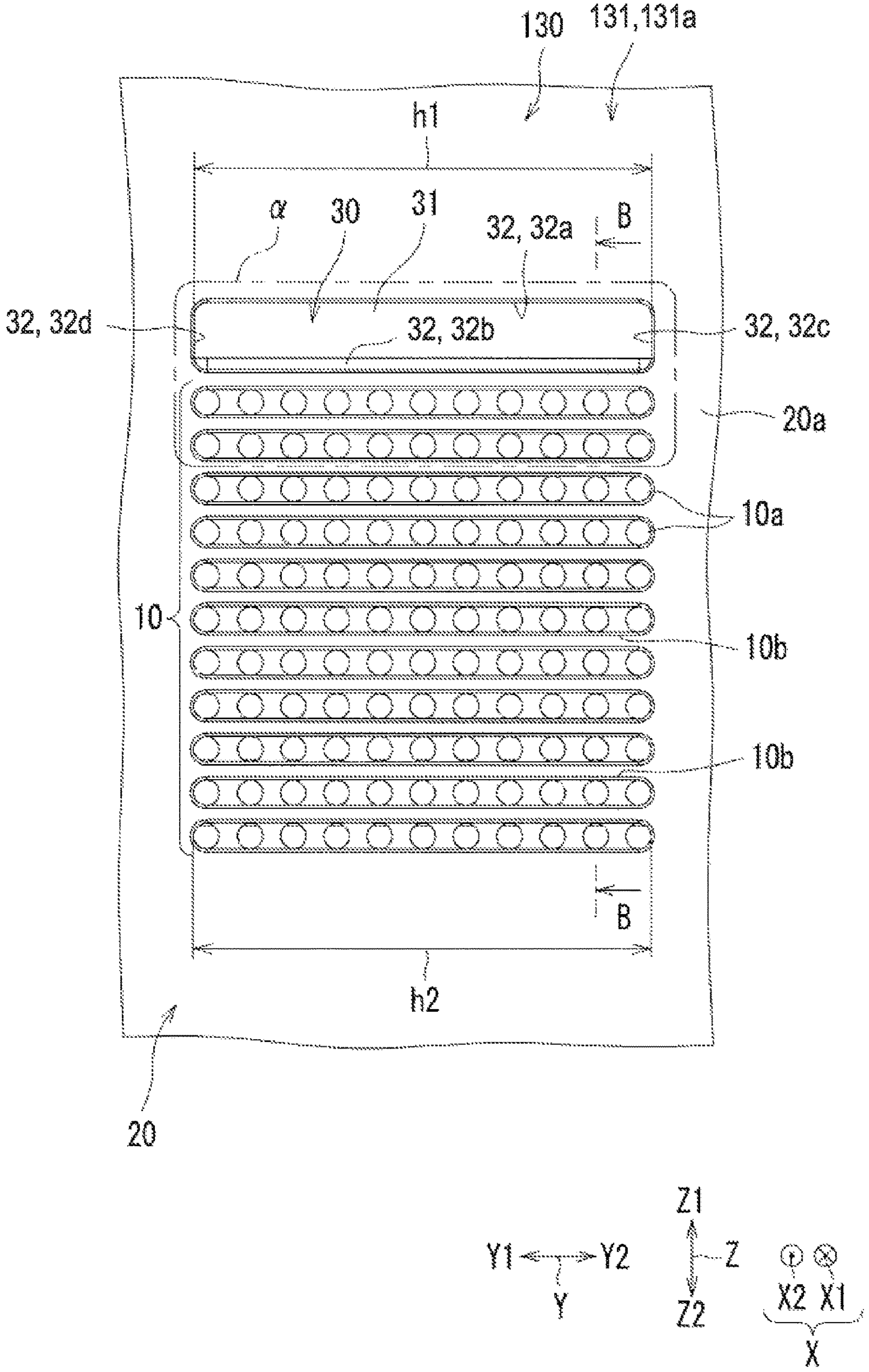
FIG. 4A is a rear view of a portion of the opening portion in the exterior member.
Figure 4B:
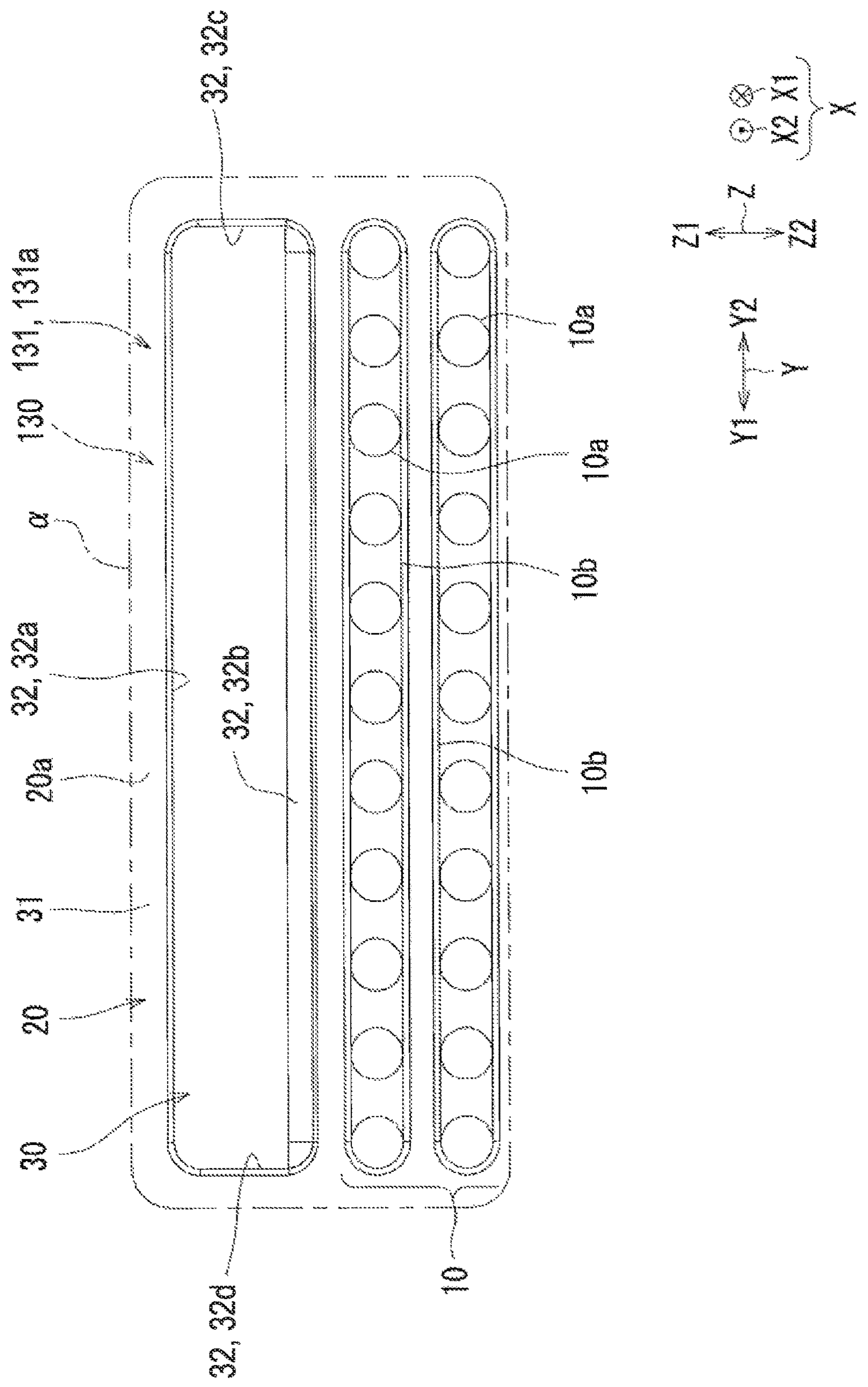
FIG. 4B is an enlarged rear view of an a portion illustrated in FIG. 4A.
Figure 4C:
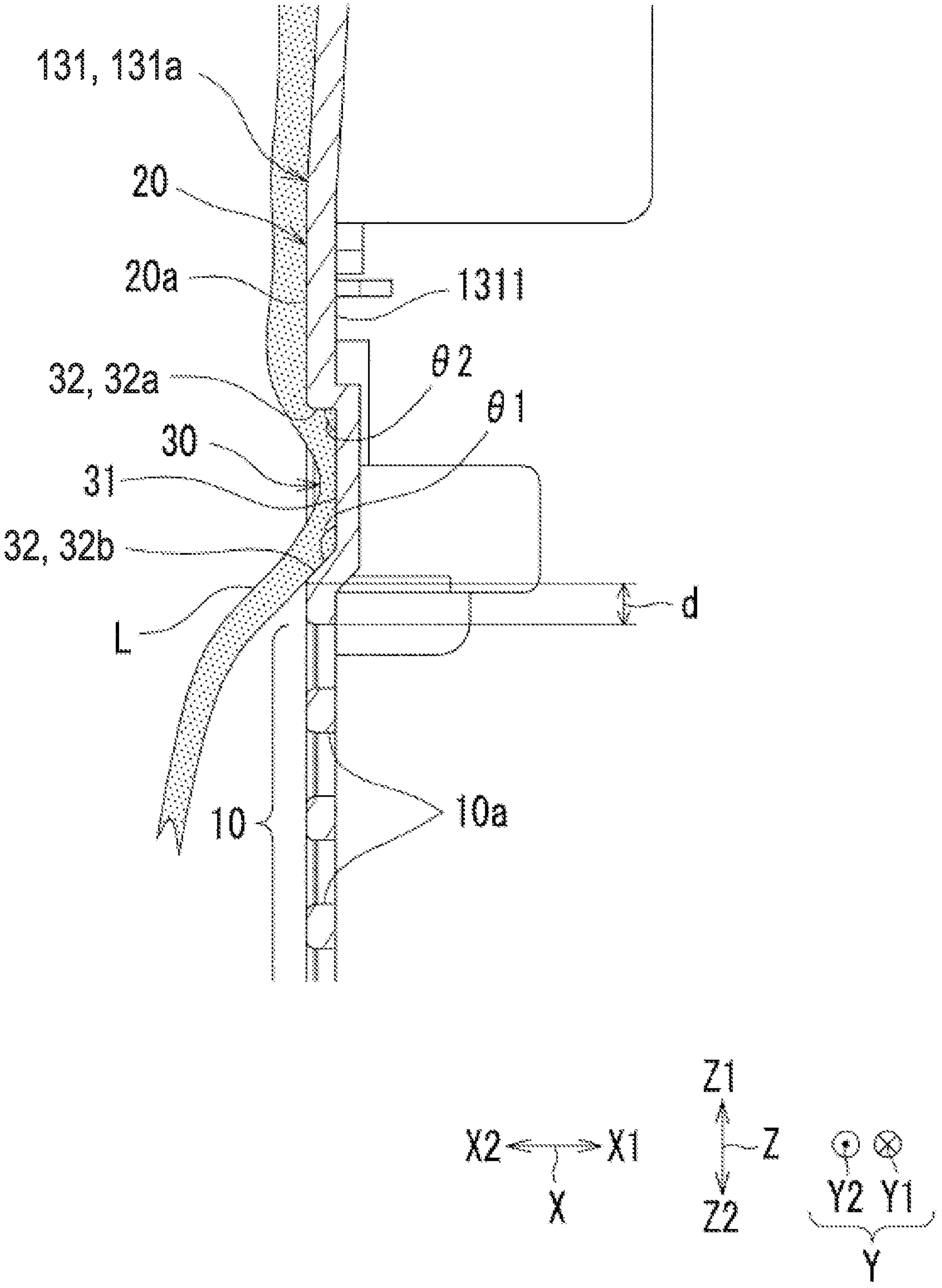
FIG. 4C is a cross-sectional view illustrating a portion including the opening portion and the recessed portion in a cross section taken along a line B-B illustrated in FIG. 4A.

FIG. 3A is a perspective view of an exterior member 130 (131) provided on an image forming apparatus main body 110 in the image forming apparatus 100 according to a first embodiment, as viewed from diagonally above on the rear surface side 100*b*. FIG. 3B is a perspective view illustrating a portion including an opening portion 10 and a recessed portion 30 in a cross section taken along a line A-A illustrated in FIG. 3A. FIG. 4A is a rear view of a portion of the opening portion 10 in the exterior member 130 (131). FIG. 4B is an enlarged rear view of an a portion illustrated in FIG. 4A. FIG. 4C is a cross-sectional view illustrating a portion including the opening portion 10 and the recessed portion 30 in a cross section taken along a line B-B illustrated in FIG. 4A.

In the electrical apparatus (in this example, the image forming apparatus 100) according to this embodiment, the opening portion 10 is provided in a side wall 20 of the exterior member 130 (in this example, an exterior cover member 131). The side wall 20 is along the vertical direction Z or inclined with respect to the vertical direction Z in this example, the side wall 20 is along the vertical direction Z (the up-down direction). As used herein, the term “opening portion” expresses a concept that includes not only a single opening but also an opening area including a plurality of through holes gathered in one place or a louver-shaped opening area. Examples of a single opening portion include an opening portion having a round shape, an oval shape, a quadrilateral shape, such as a square or the like, although the single opening portion is not limited thereto. Examples of the plurality of through holes include through holes each having a round shape, an oval shape, a quadrilateral shape, such as a square or the like, although the through holes are not limited thereto in this example, the opening portion 10 is an opening area including a plurality of round-shaped through holes 10*a* gathered in one place. The plurality of through holes 10*a* are arranged in a grid (matrix) pattern. Moreover, a plurality of louvers 10*b* are formed along the width direction Y orthogonal to both the vertical direction Z and the depth direction (the depth direction X) in the opening portion 10.

Incidentally with a portion of the side wall 20 above the opening portion 10 formed in a flat shape, if a user spills a liquid L (for example, a liquid, such as tea, coffee, or the like, in a cup) (see FIG. 4C), a surface tension of the liquid L pulls the liquid L toward the opening portion 10 and the liquid L tends to enter the opening portion 10 when the liquid. L flows along a wall surface 20*a* of the side wall 20 to reach the opening portion 10. If so, the electrical apparatus (100) is damaged [for example, damage, such as a short circuit; caused by the liquid L in electrical components 200 provided below the opening portion 10 (see FIG. 2), specifically, in primary circuit boards 201, such as power circuit boards 201*c* including a DC board 201*a*, an AC board 201*b*, or the like, and an inlet 202, is caused].

In this regard, a recessed portion 30 is provided in a portion of the side wall 20 located above the opening portion 10 in this embodiment. Herein, an example of a shape of the recessed portion 30 can be a quadrilateral shape (in this example, a rectangular shape), although the shape of the recessed portion 30 is not limited thereto.

Thus, even if the user spills liquid L, a force of the liquid L flowing from an upper side Z1 along the wall surface 20*a* of the side wall 20 can be weakened, and entry of the liquid L into the opening portion 10 due to the surface tension of the liquid L can be suppressed or eliminated, so that the liquid L flowing along the wall surface 20*a* of the side wall 20 can reliably released to the rear side X2 in the opening portion 10 with the force of the liquid L weakened by the recessed portion 30. Accordingly, the entry of liquid L into the opening portion 10 can be effectively prevented, and moreover, damage to the electrical apparatus (100) (for example, damage, such as a short circuit caused by the liquid L in the electrical components 200 provided in a lower side Z2 below the opening portion 10, specifically, in the primary circuit boards, such as the power circuit boards 201*c*, the inlet 202, or the like) can be avoided.

Furthermore, even when, in the opening portion 10, each of the number of the through holes 10*a* and the number of the louvers 10*b* is reduced, as compared to the known configurations, or eliminated, that is, even when the ventilation area that is the area of the ventilation portion in the opening portion 10 (the area ratio of the ventilated portion to the total area of the opening portion 10) is increased, it is still possible to effectively prevent entry of the liquid L into the opening portion 10.

In addition, since the recessed portion 30 is provided in a portion of the side wall 20 located above the opening portion 10, the portion above the opening portion 10 does not protrude beyond the wall surface 20*a* of the side wall 20.

As described above, according to this embodiment, the ventilation area of the opening portion 10 can be increased and, furthermore, entry of the liquid L into the opening portion 10 can be suppressed without any portion protruding beyond the wall surface 20*a* of the side wall 20.

Incidentally, in a case where a lateral width h1 in the width direction Y of the recessed portion 30 (see FIG. 4A)

is smaller than a lateral width h2 in the width direction Y of the opening portion 10 (see FIG. 4A, even when the liquid L flowing along the wall surface 20*a* of the side wall 20 is released to the rear side X2 of the opening portion 10 by the recessed portion 30, the liquid L flows outside the recessed portion 30 in the width direction. Y, so that the liquid L tends to enter the opening portion 10 outside the recessed portion 30 in the width direction Y.

In this regard, the recessed portion 30 has the lateral width h1 in the width direction Y that is equal to or larger than the lateral width h2 of the opening portion 10 in the width direction Y in this embodiment. That is, the lateral width h1 of the recessed portion 30 is equal to or larger than the lateral width h2 of the opening portion 10.

Thus, even when the liquid L flows outside the recessed portion 30 in the width direction Y, the opening portion 10 is not provided outside the recessed portion 30 in the width direction Y and therefore, it is possible to make it difficult for the liquid. L to enter the opening portion 10.

A mode of the opening portion 10 can be, for example, an exhaust port, an intake port, an exterior member 130 (131), or the like herein. In a case where a plurality of exterior members 130 are arranged adjacent to each other, the opening portion 10 may be a gap (not illustrated) formed at a joint of the adjacent exterior members 130. In this example, the opening portion 10 is an exhaust port or an intake port and, as illustrated in FIG. 2, is provided in the exterior cover member 131 provided on the rear surface 100*b* of the image forming apparatus main body 110. The exterior cover amber 131 includes a rear upper cover member 131*a* and a rear lower cover member 131*b*. Moreover, in a case where the recessed portion 30 is provided in the exterior cover member 131, a mode in which a portion of a back surface 1311 (See FIG. 4C) located on an opposite side to the recessed portion 30 of the exterior cover member 131 and corresponding to the recessed portion 30 protrudes toward the opposite side to the recessed portion 30 and a mode in which the hack surface 1311 is flat can be exemplified. In this embodiment, the back surface 1311 of the exterior cover member 131 protrudes. In this case, a thickness of the exterior cover member 131 can be made equal in a portion where the recessed portion 30 is not provided and a portion where the recessed portion 30 is provided. In a case where the back surface 1311 of the exterior cover member 131 is flat, a mode in which the thickness of the exterior cover member 131 is smaller in the portion where the recessed portion 30 is provided than in the portion where the recessed portion 30 is not provided can be exemplified.

As in this embodiment, in a case where the opening portion 10 is an exhaust port or an intake port, the number of the through holes 10*a* and the number of the louvers 10*b* in the opening portion 10 can be reduced, as compared to one of the known configurations described above, or eliminated, so that efficiency of exhaust or intake airflow can be improved because the through holes 10*a* and the louvers 10*b* are reduced or eliminated.

In this embodiment, the recessed portion 30 is formed of a bottom surface 31 and an edge surface 32 surrounding the bottom surface 31. In this example, the edge surface 32 is formed of an upper edge surface 32*a* that is an edge surface at an upper side, a lower edge surface 32*b* that is an edge surface at a lower side, a right edge surface 32*c* that is an edge surface at a right side, and a left edge surface 32*d* that is an edge surface at a left side. The lower edge surface 32*b* of the recessed portion 30 is an inclined surface that is inclined such that a height thereof gradually reduces as a distance from the bottom surface 31 increases in the vertical direction Z.

Thus, it is possible to cause the liquid L that has entered the recessed portion 30 to flow from the lower edge surface 32*b* that is an inclined surface obliquely downward of the recessed portion 30. Accordingly; it is possible to easily release the liquid L to the rear side X2 of the opening portion 10 along the lower edge surface 32*b* that is formed as an inclined surface of the recessed portion 30.

Here, an inclination angle θ1 between the bottom surface 31 and the lower edge surface 32*b* (see FIG. 4C) can be, for example, about 120 degrees or more and 150 degrees or less, although the inclination angle θ1 is not limited thereto.

Incidentally, if the upper edge surface 32*a* of the recessed portion 30 is formed to make an acute angle with the wall surface 20*a* of the side wall 20, a portion of the upper edge surface 32*a* of the recessed portion 30 is undercut and this can possibly lead to defects during molding.

In this regard, in the recessed portion 30, the upper edge surface 32*a* is vertical or approximately vertical to the wall surface 20*a* of the side wall 20 in this embodiment. The upper edge surface 32*a* of the recessed portion 30 may be an inclined surface that is inclined such that a height thereof gradually increases as a distance from the bottom surface 31 increases in the vertical direction Z. An inclination angle θ2 between the bottom surface 31 and the upper edge surface 32*a* (see FIG. 4C) can be, for example, more than 90 degrees and 150 degrees or less, although the inclination angle θ2 is not limited thereto.

As described above, the upper edge surface 32*a* of the recessed portion 30 is formed to be vertical to or inclined with respect to (in this example, vertical to) the wall surface 20*a* of the side wall 20, so that the liquid L that has flowed from above the recessed portion 30 can be easily caused to flow downward from the upper edge surface 32*a* that is the vertical surface or the inclined surface of the recessed portion 30. Thus, it is possible to reliably cause the liquid L that has flowed from above the recessed portion 30 to flow into the recessed portion 30 and to make it difficult for the liquid L to enter the opening portion 10.

Second Embodiment

Figure 5:
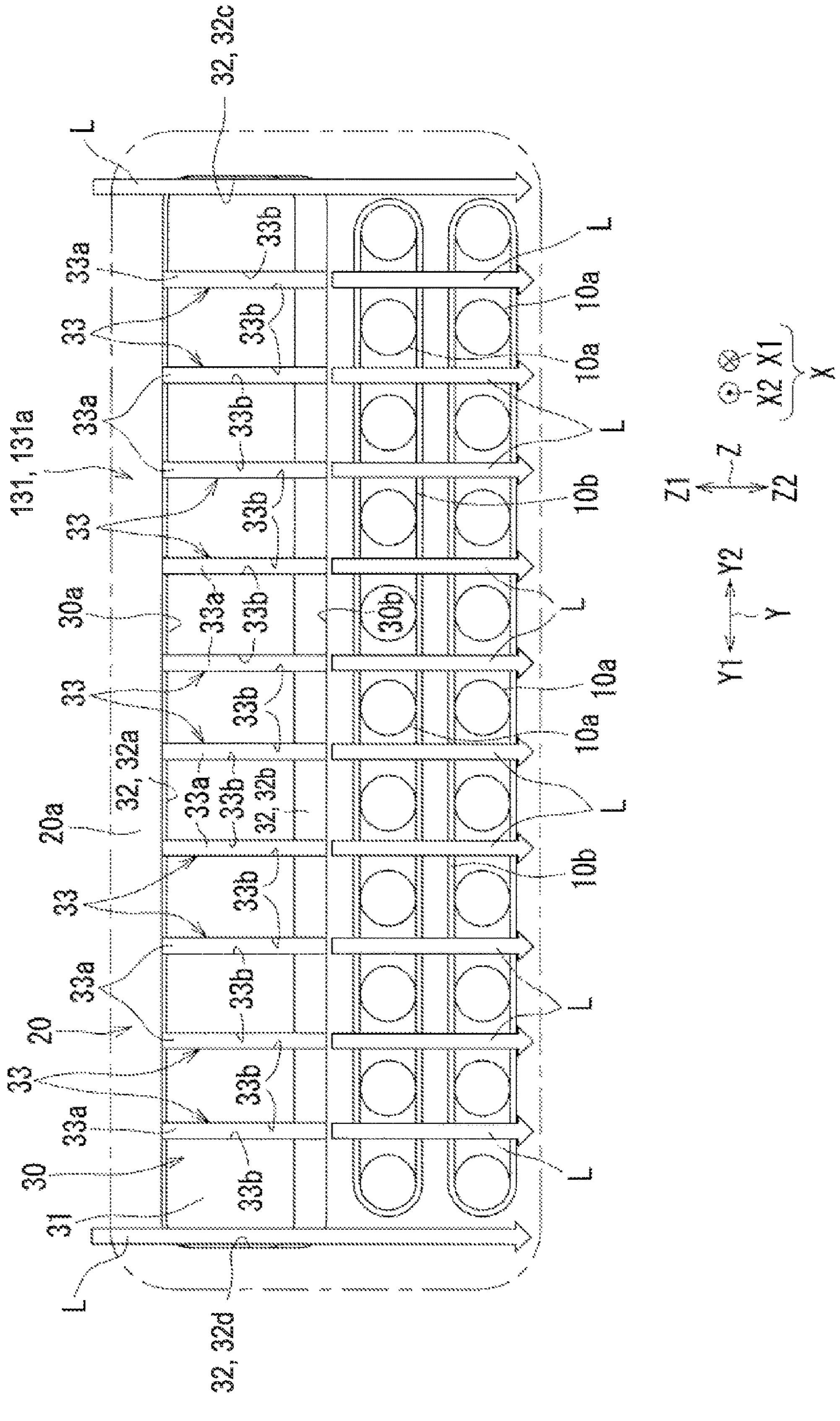
FIG. 5 is an enlarged rear view of a portion of an opening portion in an exterior member provided in an image forming apparatus main body in an image forming apparatus according to a second embodiment.

FIG. 5 is an enlarged rear view of a portion of the opening portion 10 in the exterior member 130 (131) provided in the image forming apparatus main body 110 in the image forming apparatus 100 according to a second embodiment.

In this embodiment, as illustrated in FIG. 5, a vertical surface 33*b* is connected between an upper end 30*a* and a lower end 30*b* of the recessed portion 30. The vertical surface 33*b* intersects (orthogonal to or approximately orthogonal to in this example) the bottom surface 31.

Thus, the liquid L that has flowed from the upper end 30*a* of the recessed portion 30 can be guided to the vertical surface 33*b* (in this example, the vertical surface 33*b* of a groove 33) in the recessed portion 30 and can be easily caused to flow downward along the vertical surface 33*b*. Accordingly, the liquid L can be intentionally collected on the vertical surface 33*b*, and moreover, as in this embodiment, in a case where the opening portion 10 is an opening area including a plurality of through holes 10*a* gathered in one place, the liquid L can be caused to flow on a portion in which there is no through hole 10*a* by the vertical surface 33*b* and entry of the liquid L into the opening portion 10 can be reliably suppressed. Also, as in this embodiment, in a case where the plurality of through holes 10*a* are arranged in a grid pattern, the vertical surface 33*b* is provided between adjacent ones of the through holes 10*a*, so that the liquid L that has flowed from the upper end 30*a* of the recessed portion 30 can be guided between the adjacent through holes 10*a* by the vertical surface 33*b*. Thus, entry of the liquid. L into the plurality of through holes 10*a* can be effectively prevented.

The vertical surface 33*b* may be along the vertical direction Z, and may be inclined with respect to the vertical direction Z.

In this example, at the bottom surface 31, one or more grooves 33 (recesses) are formed between the upper end 30*a* and the lower end 30*b* of the recessed portion 30. A surface forming the groove 33 includes the vertical surface 33*b*. For example, the groove 33 extends along the vertical direction Z or an inclination direction that is inclined with respect to the vertical direction Z (in this example, the vertical direction Z). Here, the groove 33 may be formed into a channel shape, may be formed into a U-shape, and may be formed into an arc shape in cross-section. The U-shape is formed of the bottom surface 33*a* and the two vertical surfaces 33*b* standing vertically or approximately vertically from both ends of the bottom surface 33*a* in the short side direction.

Thus, the vertical surface 33*b* can be formed with a simple configuration such as the groove 33.

At the bottom surface 31, one or more projections extending along the vertical direction Z or an inclination direction that is inclined with respect to the vertical direction Z may be formed between the upper end. 30*a* and the lower end 30*b* of the recessed portion 30 and a surface forming the protrusions may include the vertical surface 33*b*.

Third Embodiment

Incidentally, if the recessed portion 30 and the opening portion 10 are too far apart from each other, the liquid L that has passed through the recessed portion 30 can easily return to a side of the wall surface 20*a* of the side wall 20 and, if so, the liquid L easily tends to enter the opening portion 10.

In this regard, the recessed portion 30 is provided with a predetermined space d from the opening portion 10 (see FIG. 3B and FIG. 4C) in this embodiment.

Thus, the liquid L that has passed through the recessed portion 30 can be made to be less likely to return to the side of the wall surface 20*a* of the side wall 20, so that it can be made difficult for the liquid L to enter the opening portion 10.

Fourth Embodiment

Figure 6:
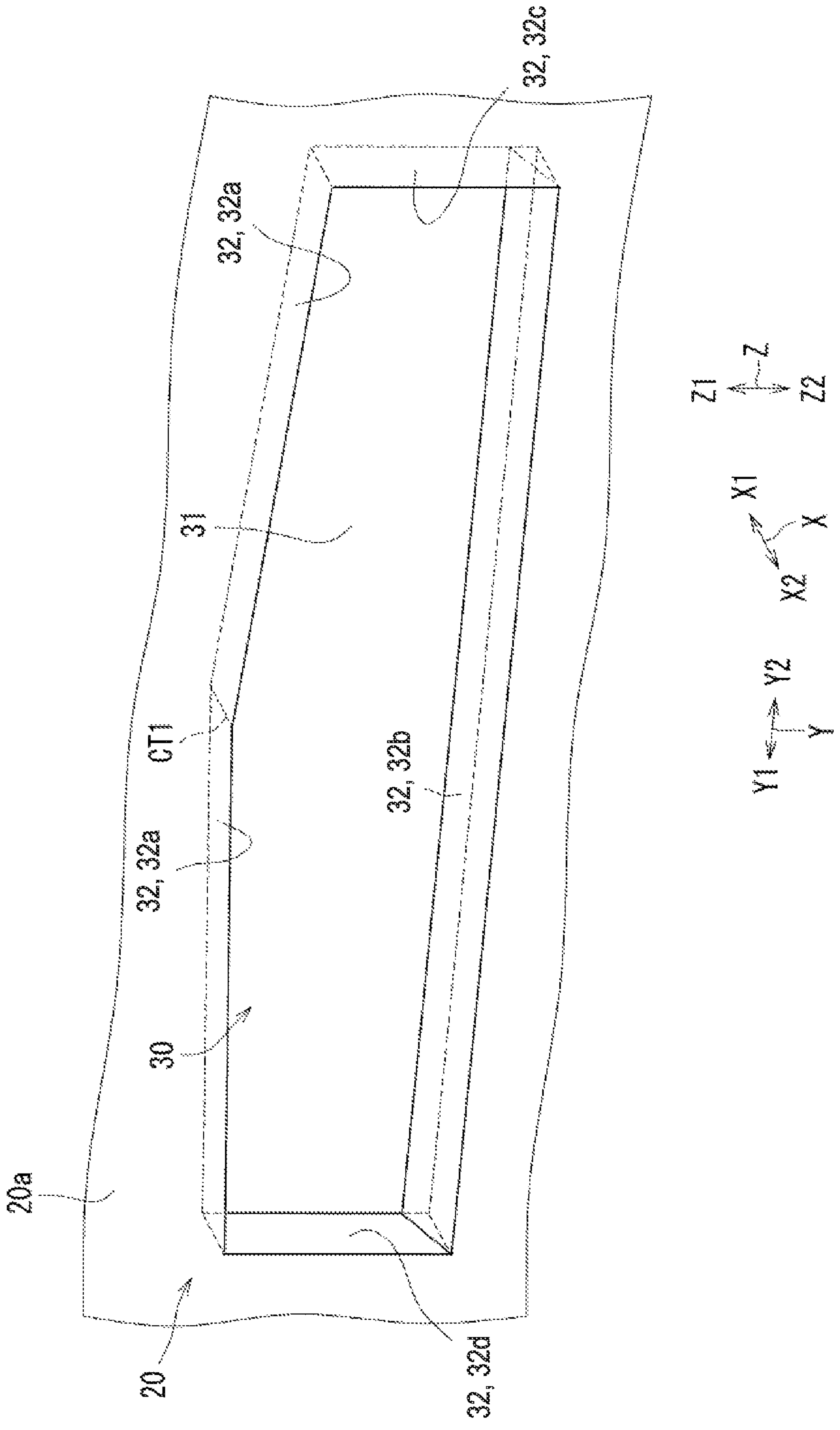
FIG. 6 is a perspective view schematically illustrating another example of a recessed portion according to the first embodiment through a third embodiment.

FIG. 6 is a perspective view schematically illustrating another example of the recessed portion 30 according to the first embodiment through a third embodiment.

In the fourth embodiment, a same component as those in the first through third embodiments will be denoted by a same reference sign as that denoting the corresponding components, and description thereof be omitted.

In this embodiment, the recessed portion 30 is formed such that a height of the upper edge surface 32*a* gradually reduces in the vertical direction as a distance from an intermediate portion CT1 (in this example, a central portion) in the width direction Y increases outward in both directions (Y1 and Y2) in the width direction Y.

Thus, the liquid L that has flowed from above the recessed portion 30 can be guided outward in both directions (Y1 and Y2) in the width direction Y with the intermediate portion. CT1 of the upper edge surface 32*a* of the recessed portion 30 as a boundary and can be easily caused to flow downward. Z2 along the upper edge surfaces 32*a*. Accordingly, the liquid L can be intentionally collected outward in both directions (Y1 and Y2) in the width direction with the intermediate portion CT1 of the upper edge surface 32*a* of the recessed portion 30 as a boundary.

Fifth Embodiment

Figure 7:
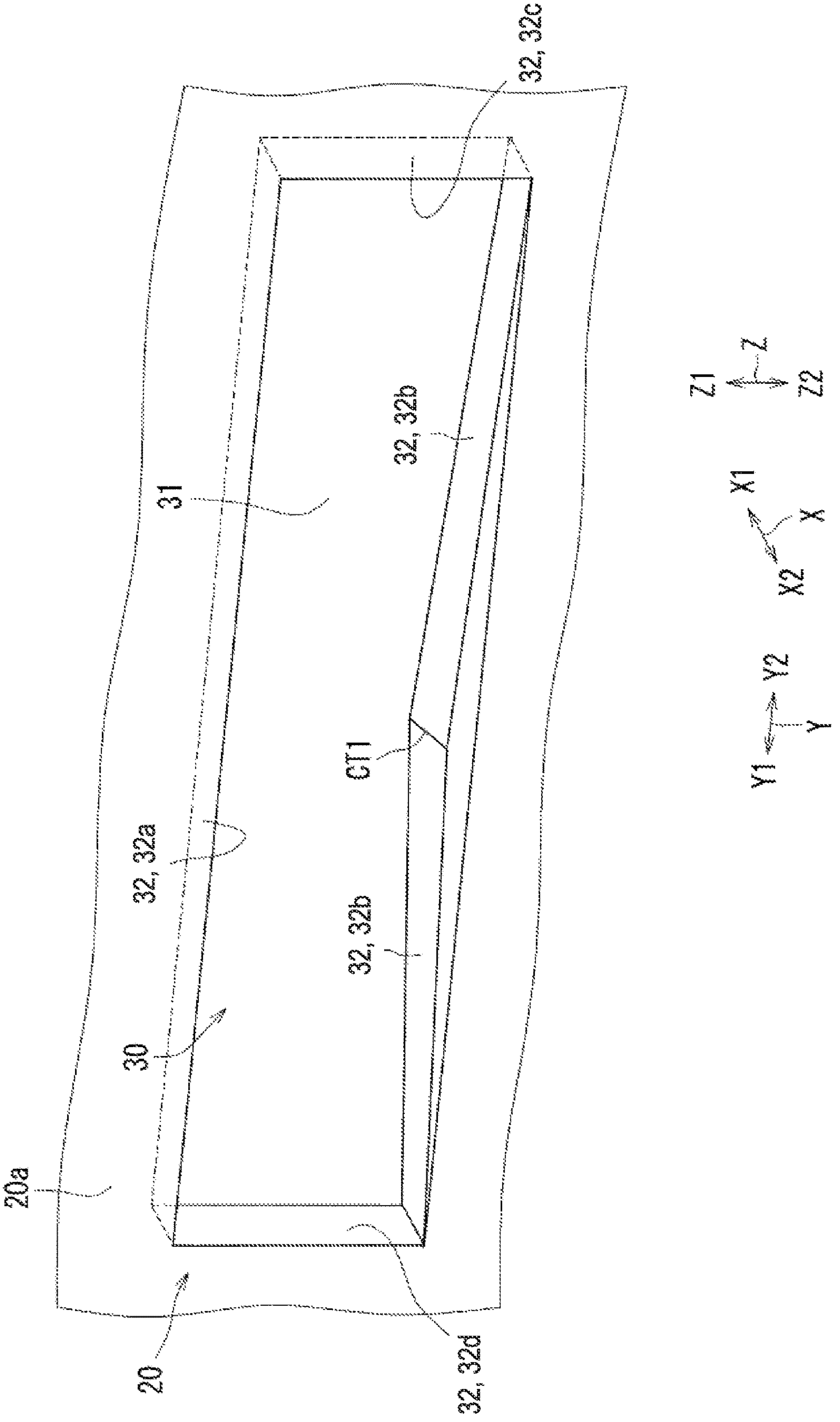
FIG. 7 is a perspective view schematically illustrating another example of the recessed portion according to the first embodiment through a fourth embodiment.

FIG. 7 is a perspective view schematically illustrating another example of the recessed portion 30 according to the first embodiment through a fourth embodiment.

In the fifth embodiment, a same component as those in the first through fourth embodiments will be denoted by a same reference sign as that denoting the corresponding components, and description thereof will be omitted.

In this embodiment, the recessed portion 30 is formed such that a height of the lower edge surface 32*b* gradually reduces in the vertical direction. Z as a distance from an intermediate portion CT2 (in this example, a central portion) in the width direction increases outward in both directions (Y1 and Y2) in the width direction Y.

Thus, the liquid L in the recessed portion 30 can be guided outward in both directions (Y1 and Y2) in the width direction Y with the intermediate portion CT2 of the lower edge surface 32*b* of the recessed portion 30 as a boundary and can be easily caused to flow downward Z2 along the lower edge surfaces 32*b*. Accordingly, the liquid. L can be intentionally collected outward in both directions (Y1 and Y2) in the width direction Y with the intermediate portion. CT2 of the lower edge surface 32*b* of the recessed portion 30 as a boundary.

OTHER EMBODIMENTS

Respective configurations of the recessed portion 30 in the exterior member 130 of the fourth embodiment as illustrated in FIG. 6 and the recessed portion 30 in the exterior member 130 of the fifth embodiment as illustrated in FIG. 7 may be combined.

Experimental Examples

Next, whether the liquid L enters in the image forming apparatus main body 110 was examined using the recessed portion 30 of the exterior cover member 131 (rear upper cover member 131*a*) of each of the first to third embodiments of FIG. 3A to FIG. 4C, and results of this experiment will be described below as well as a result for a comparative example of a known exterior cover member having a flat shape with no recessed portion 30.

The experiment was conducted by splashing water as the liquid Lon the rear upper cover member 131*a* of each of the first to third embodiments and an exterior cover member of the comparative example in a single item state from above. As the water, colored test water was used in order to increase visibility of water leakage. To check whether there was water leakage, white paper was placed inside the opening portion 10 (inside the apparatus) and whether there was water leakage was determined based on presence or absence of the colored water.

In the exterior cover member of the comparative example, a force of water flowing from above during pouring water was so strong that water entered inside of the opening portion 10 (inside the apparatus), whereas, in the exterior cover member 131 of each of the first to third embodiments, the force of water during pouring water was successfully weakened and entry of water into the inside of the opening portion 10 (inside the apparatus) was avoided.

The present disclosure is not limited to the above-described embodiments but can be implemented in various other forms. Therefore, the embodiments described above are in all respects merely illustrative and should not be interpreted in a limiting manner. The scope of the present disclosure is indicated by the scope of the claims and is no way restricted by the text of the specification. Furthermore, all variations and modifications that fall within the equivalent range of the scope of the claims fall within the scope of the present disclosure.

What is claimed is:

1. An electrical apparatus with an opening portion provided in a side wall of an exterior member, the electrical apparatus comprising:

a recessed portion formed on an outer surface of the side wall along a vertical direction in a portion above the opening portion, the recessed portion having a bottom surface that is dented from the side wall in an inward direction of the electrical apparatus and that is formed along the vertical direction, wherein the recessed portion further has a lateral width in a width direction orthogonal to both the vertical direction and a depth direction that is the inward direction of the electrical apparatus from the side wall, the lateral width of the recessed portion being equal to or larger than a lateral width of the opening portion in the width direction, the recessed portion is formed of the bottom surface and an edge surface surrounding the bottom surface, and a lower edge surface, that is the edge surface at a lower side in the vertical direction, is an inclined surface that is inclined such that a height of the lower edge surface gradually reduces in the vertical direction as a distance from the bottom surface increases toward an outward direction of the electrical apparatus, and a depth of the recessed portion from the outer surface of the side wall to the bottom surface is the same as a thickness of the side wall, or is not more than the thickness of the side wall.

2. The electrical apparatus according to claim 1, wherein an electrical component is provided below the opening portion.

3. The electrical apparatus according to claim 1, wherein the opening portion is an exhaust port or an intake port.

4. The electrical apparatus according to claim 1, wherein an upper edge surface that is the edge surface at an upper side is a vertical surface that is vertical or approximately vertical to a wall surface of the side wall.

5. The electrical apparatus according to claim 1, wherein the recessed portion is provided with a predetermined space from the opening portion.

6. An image forming apparatus comprising the electrical apparatus according to claim 1, wherein the opening portion is provided in the side wall of the exterior member of an image forming apparatus main body.

7. An electrical apparatus with an opening portion provided in a side wall of an exterior member, the electrical apparatus comprising:

a recessed portion formed on an outer surface of the side wall along a vertical direction in a portion above the opening portion, the recessed portion having a bottom surface that is dented from the side wall in an inward direction of the electrical apparatus and that is formed along the vertical direction, wherein the recessed portion further has a lateral width in a width direction orthogonal to both the vertical direction and a depth direction that is the inward direction of the electrical apparatus from the side wall, the lateral width of the recessed portion being equal to or larger than a lateral width of the opening portion in the width direction, and the recessed portion is formed of the bottom surface and an edge surface surrounding the bottom surface, and a lower edge surface, that is the edge surface at a lower side in the vertical direction, is formed such that a height of the lower edge surface gradually reduces in the vertical direction as a distance from an intermediate portion in the width direction increases outward in both directions in the width direction.

8. The electrical apparatus according to claim 7, wherein an electrical component is provided below the opening portion.

9. The electrical apparatus according to claim 7, wherein the opening portion is an exhaust port or an intake port.

10. The electrical apparatus according to claim 7, wherein an upper edge surface that is the edge surface at an upper side is a vertical surface that is vertical or approximately vertical to a wall surface of the side wall.

11. The electrical apparatus according to claim 7, wherein the recessed portion is provided with a predetermined space from the opening portion.

12. An image forming apparatus comprising the electrical apparatus according to claim 7, wherein the opening portion is provided in the side wall of the exterior member of an image forming apparatus main body.

* * * * *